(12) United States Patent
Odderson

(10) Patent No.: US 6,782,573 B2
(45) Date of Patent: Aug. 31, 2004

(54) BODY SUPPORTING, SERIAL INFLATING SEAT

(76) Inventor: Ib R. Odderson, 9319 NE. 135th La., Kirkland, WA (US) 98034

(*) Notice: Subject to any disclaimer, the term of this patent is extended or adjusted under 35 U.S.C. 154(b) by 0 days.

(21) Appl. No.: 10/075,210

(22) Filed: Feb. 12, 2002

(65) Prior Publication Data

US 2002/0108180 A1 Aug. 15, 2002

Related U.S. Application Data

(60) Provisional application No. 60/268,598, filed on Feb. 13, 2001.

(51) Int. Cl.[7] .................... A47C 27/10; A61H 9/00
(52) U.S. Cl. .................... 5/654; 5/655.3; 297/284.1; 297/284.6
(58) Field of Search .................... 5/654, 653, 655.3; 297/284.1, 284.6, DIG. 3

(56) References Cited

U.S. PATENT DOCUMENTS

| | | | | |
|---|---|---|---|---|
| 2,136,510 A | * | 11/1938 | Jensen .................. 137/223 |
| 2,627,302 A | * | 2/1953 | Forsyth .................. 297/452.48 |
| 2,998,817 A | * | 9/1961 | Armstrong .................. 601/149 |
| 3,363,941 A | * | 1/1968 | Wierwille .................. 297/284.3 |
| 3,595,223 A | * | 7/1971 | Castagna .................. 601/55 |
| 3,613,671 A | * | 10/1971 | Poor et al. .................. 601/149 |
| 3,867,732 A | * | 2/1975 | Morrell .................. 5/654 |
| 3,982,786 A | * | 9/1976 | Burgin et al. .................. 297/284.3 |
| 4,017,118 A | * | 4/1977 | Cawley .................. 297/284.3 |
| 4,761,011 A | * | 8/1988 | Sereboff .................. 297/DIG. 3 X |
| 4,840,425 A | | 6/1989 | Noble .................. 297/284 |
| 4,969,684 A | * | 11/1990 | Zarotti .................. 297/180.12 |
| 5,029,939 A | | 7/1991 | Smith et al. .................. 297/284 |
| 5,127,708 A | * | 7/1992 | Kishi et al. .................. 297/284.1 |
| 5,129,704 A | * | 7/1992 | Kishi et al. .................. 297/284.1 |
| 5,155,685 A | * | 10/1992 | Kishi et al. .................. 701/49 |
| 5,263,765 A | * | 11/1993 | Nagashima et al. .................. 297/284.6 |
| 5,277,474 A | * | 1/1994 | Hannagan et al. .................. 297/284.1 |
| 5,320,409 A | * | 6/1994 | Katoh et al. .................. 297/284.6 |
| 5,343,876 A | * | 9/1994 | Rogers .................. 5/653 |
| 5,369,828 A | * | 12/1994 | Graebe .................. 5/654 |
| 5,379,471 A | | 1/1995 | Holdredge .................. 5/456 |
| 5,433,506 A | * | 7/1995 | Jensen .................. 297/284.3 |
| 5,461,741 A | * | 10/1995 | Graebe .................. 5/654 |
| 5,487,197 A | * | 1/1996 | Iskra, Jr. et al. .................. 5/654 |
| 5,500,965 A | * | 3/1996 | Hannagan et al. .................. 5/654 |
| 5,551,107 A | * | 9/1996 | Graebe .................. 5/654 |
| 5,596,781 A | * | 1/1997 | Graebe .................. 5/655.3 X |
| 5,613,257 A | * | 3/1997 | Graebe .................. 5/654 |
| 5,678,891 A | | 10/1997 | O'Neill et al. .................. 297/287.6 |
| 5,687,099 A | | 11/1997 | Gross et al. .................. 365/558 |
| 5,762,618 A | * | 6/1998 | Yamanaka et al. .................. 601/148 |
| 5,792,082 A | * | 8/1998 | Yamanaka et al. .................. 601/148 |
| 5,845,352 A | * | 12/1998 | Matsler et al. .................. 5/654 |
| 5,848,982 A | * | 12/1998 | Hoshino et al. .................. 601/150 |
| 5,881,407 A | | 3/1999 | Chu Pt .................. 5/654 |
| 5,893,184 A | * | 4/1999 | Murphy .................. 297/452.41 |
| 6,088,642 A | | 7/2000 | Finkelstein et al. .................. 701/49 |

(List continued on next page.)

Primary Examiner—Robert G. Santos
(74) Attorney, Agent, or Firm—Dean A. Craine

(57) ABSTRACT

A sequentially or serial inflating seat cushion comprising at least three transversely aligned inflatable air bladders connected to a pump and timer. The air bladders are inflated sequentially, from front to back, over a period of approximately eleven seconds and simultaneously deflated to slowly pump blood upward in the legs thereby reducing blood pooling. Connected to the pump is a valve that keeps the air bladders inflated a selective amount of time. The cycle is then repeated continuously. Located adjacent to the back air bladder is a transversely aligned, non-inflating seat section which continuously supports the user's ischial tuberocities to prevent slippage over the seat. An alternate embodiment offers a split seat option with six inflatable bladders.

7 Claims, 3 Drawing Sheets

U.S. PATENT DOCUMENTS

| | | | |
|---|---|---|---|
| 6,088,643 A | 7/2000 | Long et al. | 701/49 |
| 6,092,249 A | 7/2000 | Kamen et al. | 5/653 |
| 6,098,000 A | 8/2000 | Long et al. | 701/49 |
| 6,168,238 B1 * | 1/2001 | Hannagan | 297/423.3 |
| 6,203,105 B1 * | 3/2001 | Rhodes, Jr. | 297/284.6 |
| 6,209,159 B1 * | 4/2001 | Murphy | 5/654 |
| 6,212,719 B1 * | 4/2001 | Thomas et al. | 5/654 X |
| 6,273,810 B1 * | 8/2001 | Rhodes, Jr. et al. | 5/654 X |
| 6,367,106 B1 * | 4/2002 | Gronsman | 5/655.3 X |
| 6,502,263 B1 * | 1/2003 | Rowley et al. | 5/654 |
| 6,551,450 B1 * | 4/2003 | Thomas et al. | 156/580.1 |
| 6,592,533 B1 * | 7/2003 | Yonekawa et al. | 601/148 |
| 6,623,080 B2 * | 9/2003 | Clapper | 297/452.41 |
| 6,668,405 B1 * | 12/2003 | Kohlman | 5/654 |
| 6,682,059 B1 * | 1/2004 | Daniels et al. | 267/131 |
| 2002/0108180 A1 * | 8/2002 | Odderson | 5/654 |
| 2003/0038517 A1 * | 2/2003 | Moran et al. | 297/284.6 X |

* cited by examiner

US 6,782,573 B2

BODY SUPPORTING, SERIAL INFLATING SEAT

This is a utility patent application based on a provisional patent application (Serial No. 60/268,598) filed on Feb. 13, 2001.

BACKGROUND OF THE INVENTION

1. Field of the Invention

This invention pertains to seat cushions, and, more particularly, to seats having inflatable air bladders that inflate sequentially to promote upward blood flow in the user's legs while sitting.

2. Description of the Related Art

It is well known that prolonged sitting in a car, on a plane, or in a chair inhibits blood flow from the legs to the heart, resulting in leg discomfort. Constant pressure is applied by the seat to the back of the legs, physically blocking venous flow. Blood begins to pool in the legs which eventually causes discomfort. Intermittent pressure relief for the back of the thighs and buttocks is required to prevent fatigue, skin breakdown, and blood clot formation. Special mechanical and weight limitations often prevent adequate leg movement to relieve such pressure on the thighs.

Heretofore, seat cushions containing inflatable bladders to vary the pressure points on a person's legs and buttocks have been developed (see U.S. Pat. Nos. 6,098,000, 6,092,249, 6,088,643, 6,088,642, 6,041,784, 5,881,407, 5,687,099, 5,678,891, 5,487,197, 5,379,471, 5,029,939, and 4,840,425). However, none of these seat cushions provide transversely aligned bladders that inflate individually and sequentially from front to back to promote venous blood flow in the legs. Also, none of these seat cushions include features that prevent slippage of the user's buttocks over the seat when the bladders are inflated.

What is needed is a seat cushion with transversely aligned and sequentially inflated air bladders that apply pressure to the back of the legs to promote venous blood flow in the user's legs when sitting, and include means to prevent forward movement of the user's buttocks over the seat during use.

SUMMARY OF THE INVENTION

It is an object of the present invention to provide a seat or seat cushion with inflatable bladders that inflate sequentially from front to back to promote venous blood flow in the legs.

It is another object of the present invention to provide such a seat or seat cushion that allows the sequentially inflated bladders to remain inflated for a sufficient amount of time before deflating so that blood is forced upward through the veins.

It is a further object of the present invention to include means to prevent forward movement of the user's buttocks over the seat during use.

These and other objects of the invention which will become apparent are met by an anti-edema, blood-flow-promoting seat comprising at least three transversely aligned, inflatable air bladders connected to a pump and timer. The bladders are inflated serially and sequentially, from front to back, over a period of approximately eleven seconds and simultaneously deflated to slowly pump blood upward in the legs thereby reducing blood pooling. The cycle is then repeated continuously. Located adjacent to the back air bladder is a transversely aligned, non-inflating seat cushion which continuously supports the user's ischial tuberocities while sitting to prevent forward movement of the user's buttocks over the seat while the bladders are inflating and deflating. In the first embodiment, the air bladders extend transversely over the entire width of the seat so that pressure is applied under both legs. In an alternate embodiment offers a split seat option with six inflatable bladders. The six inflatable bladders are divided into two sets of inflatable bladders aligned transversely over one-half of the seat. The user is able to independently control each set of bladders so that all of the bladders in both sets or in each set are constantly inflated, constantly deflated, or sequentially inflated and deflated.

DESCRIPTION OF THE PREFERRED EMBODIMENT(S)

Figure 1:
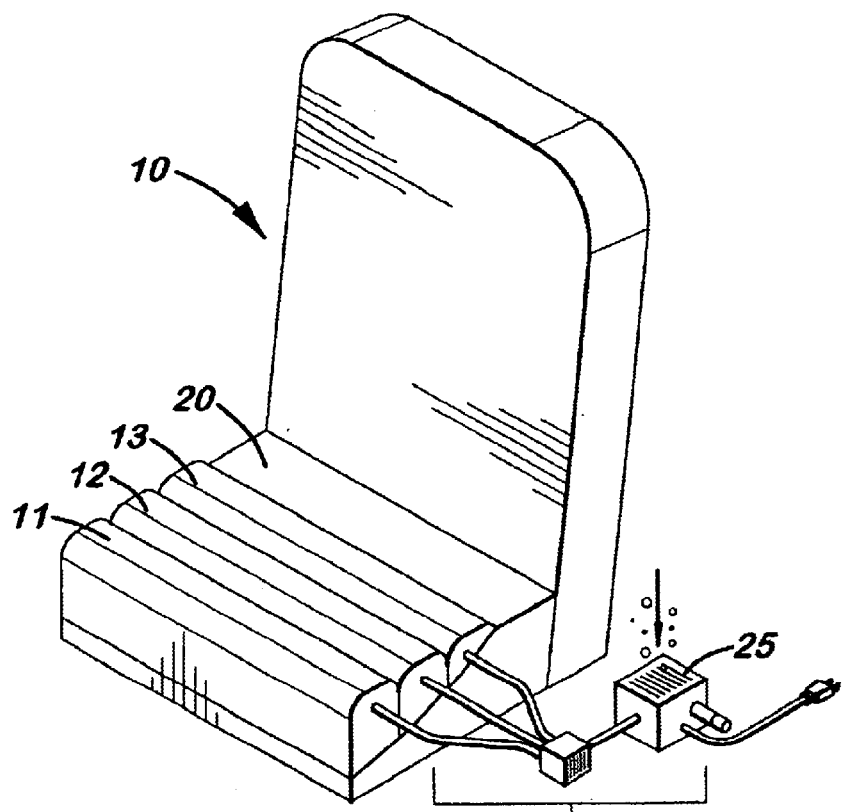
FIG. 1 is a perspective view of a seat with the serial inflated air bladders constructed in the seat.
Figure 2:
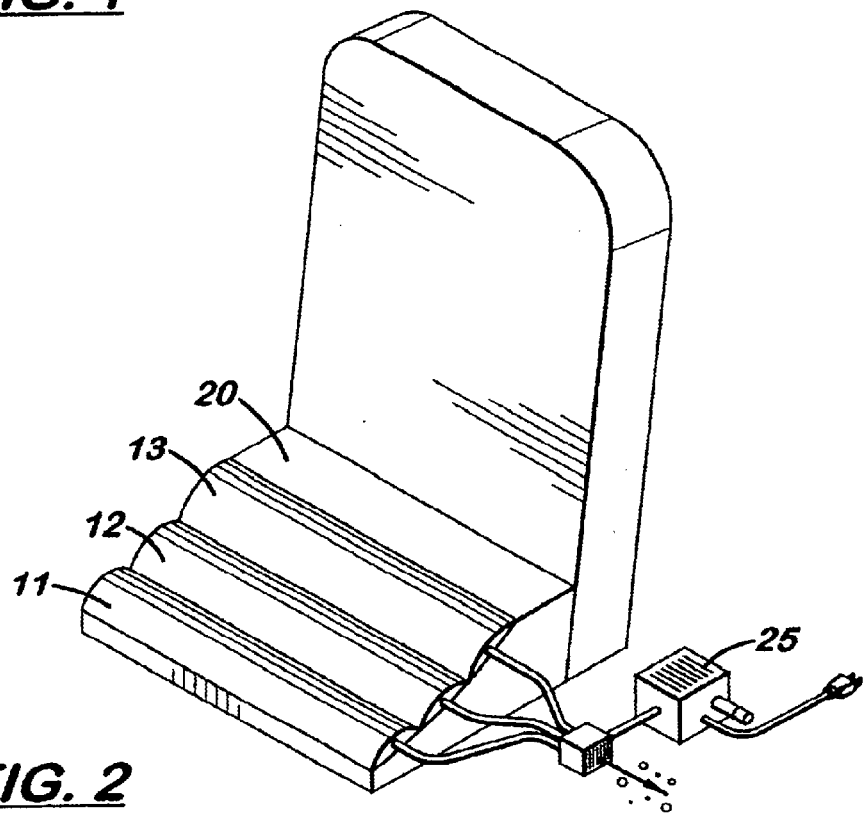
FIG. 2 is a perspective view of the seat shown in FIG. 1 with the air bladders in a fully deflated condition.
Figure 3:
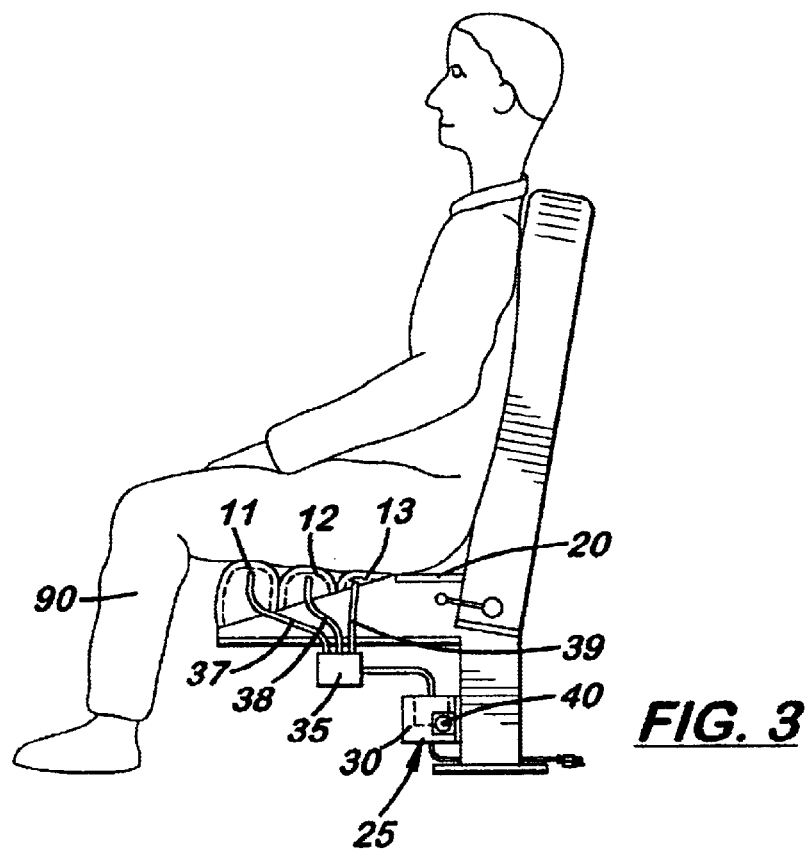
FIG. 3 is a side elevational view of an individual sitting in the seat shown in FIGS. 1 and 2 showing the relative position of the individual's leg against the air bladders.
Figure 4:
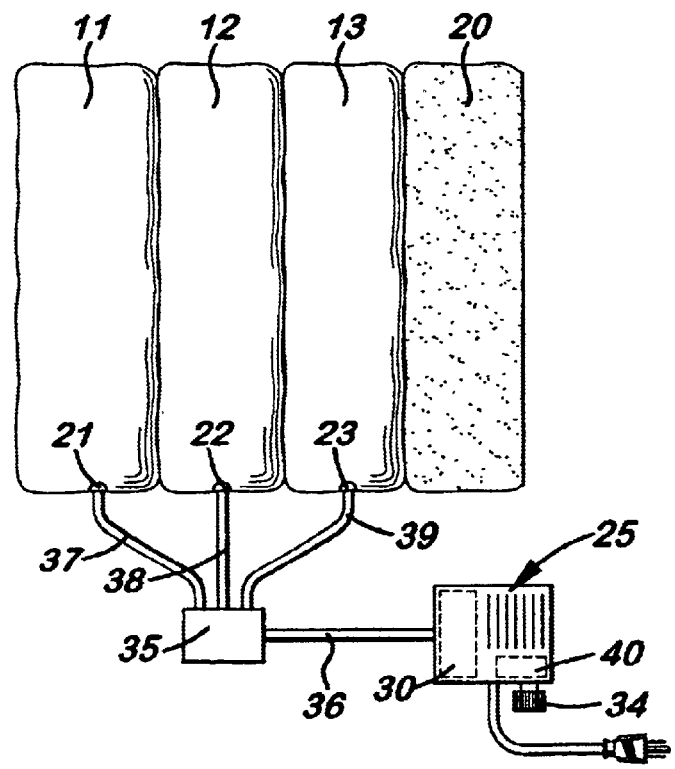
FIG. 4 is a top plan view of one embodiment of the seat member having three expansion bladders.
Figure 5:
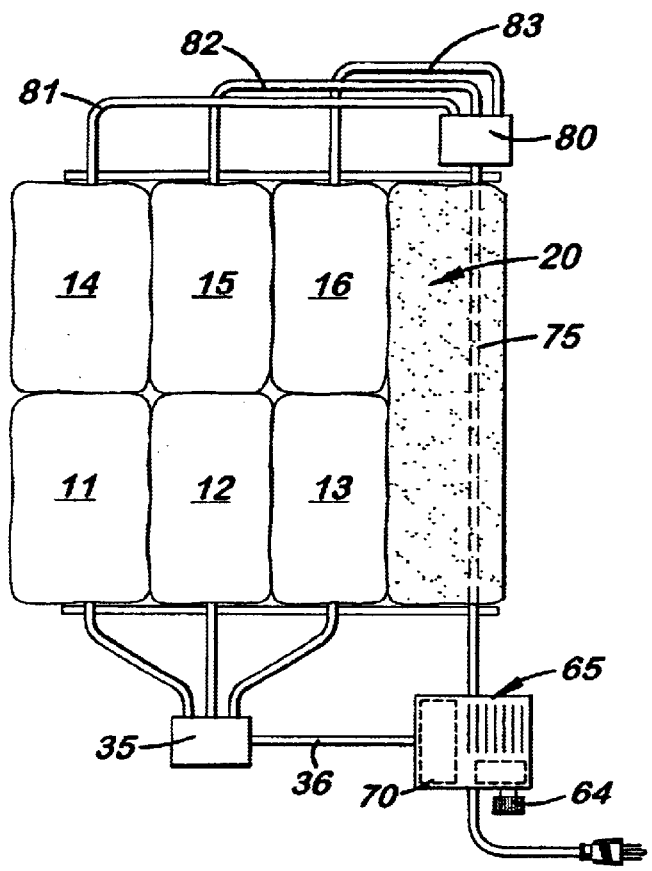
FIG. 5 is a top plan view of a second embodiment of the seat member having six expansion bladders.
Figure 6:
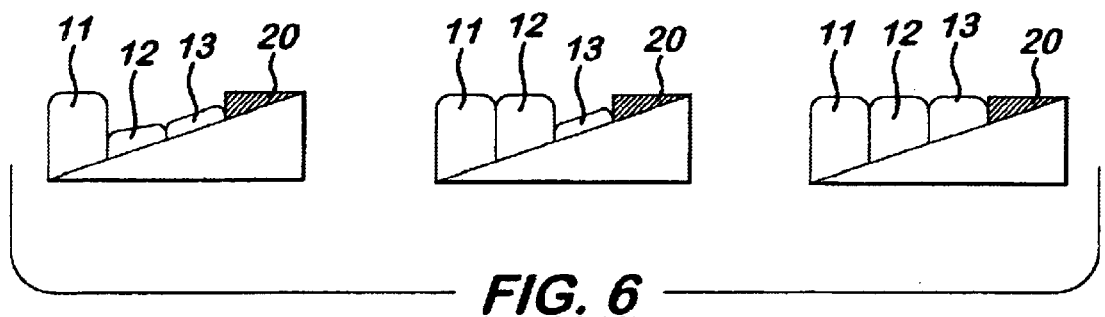
FIG. 6 is a side elevational view showing the sequential inflation of the air bladders.

Referring to the accompanying FIGS. 1–6, there is shown and described an anti-edema, blood flow promoting seat 10 comprising at least three transversely aligned, inflatable air bladders 11, 12, 13 that extend across the seat and connected to a pump 30. The air bladders 11, 12, 13 are inflated serially and sequentially as shown in FIG. 6, from front to back, over a period of approximately eleven seconds, and simultaneously deflated to slowly pump blood upward in the user's legs 90 while sitting, thereby reducing blood pooling.

Located adjacent to the rear air bladder 13 is a transversely aligned, non-inflating seat cushion 20 designed to continuously support the user's ischial tuberocities while sitting. During use, the non-inflating air cushion 20 prevents forward movement of the user's buttocks over the seat 10 while the air bladders 11, 12, 13 are continuously inflated and deflated.

In the preferred embodiment, the air pump 30 and timer 40 are assembled in an enclosed air control unit 25 similar to the controller disclosed in U.S. Pat. No. 4,253,449 and incorporated by reference herein. The unit 25 supplies pressurized fluid through a conduit system 50 to the air bladders 11, 12, 13.

The unit 25, shown more clearly in FIG. 4, includes an electric air pump 30 controlled by an on-off button 34 that supplies constant air pressure when activated. A main conduit 36 connects the air pump 30 to a valve 35 that controls the distribution of the air through branch conduits 37, 38, 39 from the air pump 30 to a combination inlet/outlet port 21, 22, 23 on the bladders 11, 12, 13, respectively.

The timer 40 controls the sequence of filling the air bladders 11, 12, 13, the length of time for inflation, the length of time of holding, and the length of time for deflation. By controlling these three parameters, the air bladders 11, 12, 13 are sequentially inflated to press against the thigh and cause flow of blood in the veins toward the body. In the preferred embodiment, the timer 40 is set so that the air bladders 11, 12, 13 sequentially inflate over a period of approximately eleven seconds.

In FIG. 5, the second embodiment of the invention is shown with two sets of inflatable air bladders 11, 12, 13, and 14, 15, 16, respectively, transversely aligned over one-half of the seat on opposite sides of the seat 10. The first set of air bladders 11, 12, 13 is connected to the manifold 55. The second set of air bladders 14, 15, 16 is connected to a second valve 80. A large capacity control unit 65 with a larger pump 70 is used in this embodiment. A transversely aligned conduit 75 connects the second control unit 65 to the second valve 80 designed to sequentially inflate the air bladders 11, 12, 13 and 14, 15, and 16 on opposite sides of the seat 10 via branch conduits 81, 82, 83. The control unit 65 includes an optional control switch 64 that enables the user to independently control the two sets of inflatable air bladders 11, 12, 13 and 14, 15, 16. The user is able to independently control each set of bladders 11, 12, 13, and 14, 15, 16 so that all of the bladders 11, 12, 13, and 14, 15, 16, in both sets or in each set are constantly inflated, constantly deflated, or serially and sequentially inflated and deflated.

In compliance with the statute, the invention described herein has been described in language more or less specific as to structural features. It should be understood, however, that the invention is not limited to the specific features shown, since the means and construction shown, comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A body supporting, serial inflating seat, comprising:
   a. at least three transversely aligned, inflatable air bladders, said air bladders being sufficient in length to apply pressure to the back surface of a leg when seating on said air bladders;
   b. an air pump connected to each said air bladder to selectively inflate said air bladders;
   c. a valve connected to each said air bladder to control the flow of air into and out of each said air bladder;
   d. a timer connected to said pump to serially and or simultaneously sequentially inflate said air bladders from front to back, and connected to said valve to sequentially deflate said air bladders after a preselected time period to move blood upward in a leg disposed over said air bladders; and,
   e. a transversely aligned, rear cushion disposed adjacent to the rear-most said air bladder for continuously supporting the ischial tuberocities of the user when sitting.

2. The body supporting, serial inflating seat, as recited in claim 1, further including a control switch connected to said valve means that enables one of said air bladders to be constantly inflated, constantly deflated, or sequentially inflated and deflated.

3. The body supporting, serial inflating seat, comprising:
   a. two sets of three transversely aligned, inflatable air bladders, each said set of air bladders transversely extending under a leg of a user when sitting on said seat;
   b. an air pump connected to each set of said air bladder to selectively inflate said air bladders;
   c. a valve connected to each said air bladder to control the flow of air into and out of each said air bladder;
   d. a timer connected to said pump and said valve to serially and sequentially inflate and simultaneously or sequentially deflate said air bladders after a preselected time period, thereby forcing blood in the legs of the user to flow upward; and,
   e. a transversely aligned, rear cushion disposed adjacent to the rear-most said air bladder for continuously supporting the ischial tuberocities of the user when sitting.

4. The body supporting, serial inflating seat, as recited in claim 3, further including a control switch connected to said valve that enables said air bladders in one set of said air bladders to be constantly inflated, constantly deflated, or sequentially inflated and deflated.

5. The body supporting, serial inflating seat, as recited in claim 1, wherein said air bladders extend transversely across said seat and under both legs of a user when sitting on said seat.

6. The body supporting, serial inflating seat, as recited in claim 1, wherein said air bladders extend transversely over one half of a seat and under one leg of a user when sitting on said seat.

7. The body supporting, serial inflating seat, as recited in claim 6, further including a second set of three air bladders extended transversely over one-half of a seat and under the opposite leg of a user when sitting on said seat.

* * * * *